United States Patent Office 3,654,192
Patented Apr. 4, 1972

3,654,192
POLY(ARYLENE S-TRIAZINES)
Herward A. Vogel, Oakdale Township, Washington County, Minn., assignor to Minnesota Mining and Manufacturing Company, St. Paul, Minn.
No Drawing. Filed Aug. 19, 1968, Ser. No. 753,743
Int. Cl. C08g 33/00
U.S. Cl. 260—2 R
21 Claims

ABSTRACT OF THE DISCLOSURE

Aromatic dinitriles, such as 4,4'-dicyanodiphenyl ether, are heated in the presence of a catalyst, such as trifluoromethane sulfonic acid or a Lewis acid catalyst, e.g., zinc chloride, to form solid polymers with a plurality of s-triazine rings linked together with arylene bridges, such polymers being useful in films, coatings, fibers, molded articles, adhesives, and sealants.

FIELD OF THE INVENTION

This invention relates to a method for the preparation of triazine polymers. In another aspect, it relates to high molecular weight polymers containing recurring s-triazine rings linked with polyarylene bridges.

BACKGROUND OF THE PRIOR ART

By way of background, a number of patents have issued in the last several years disclosing the preparation of polymers containing triazine rings, but I am not aware of any prior art that discloses polymerizing polynuclear aromatic dinitriles to produce thermally stable, chemically inert and solvent resistant solid polymers of relatively high molecular weight with recurring s-triazine rings linked with polyarylene bridges. In this regard, mention should be made of U.S. Pat. No. 3,060,179 (Toland), which discloses trimerization of mono-nuclear aromatic dinitriles, such as phthalonitriles, with metal salt catalysts, e.g., zinc chloride, to produce relatively low molecular weight trimer compounds, 1,3,5-triazines, rather than polymers. Although U.S. Pat. No. 3,297,639 (Picklesimer et al.) discloses the preparation of high molecular weight polymers containing triazine rings, these polymers are produced by interfacial polycondensation of halogen-containing triazines, such as cyanuric chloride, and polyhydric aromatic compounds, such as resorcinol, and these polymers are really cyanurate polymers since the arylene bridges are linked to the triazine rings by ethereal oxygen atoms to form recurring cyanurate rings, which are relatively unstable as compared to triazine rings. Belgium Pat. No. 702,307 broadly discloses condensation of certain dinitriles in the presence of metal oxide catalysts to form, inter alia, high molecular weight insoluble polymers but there is no teaching in this disclosure of using dinitriles which produce polymers with recurring s-triazine rings linked with polyarylene bridges. Though not related to aromatic-triazine polymers, mention should be made of related U.S. Pats. Nos. 3,317,484 and 3,347,901 (both issued to Fritz et al.), which disclose the preparation of triazine homopolymers from perfluoroether dinitriles.

BRIEF DESCRIPTION OF THE INVENTION

Briefly, I have discovered that relatively high molecular weight solid aromatic s-triazine polymers can be prepared by heating or thermally polymerizing poly-nuclear aromatic dinitriles in the liquid phase in the presence of trifluoromethane sulfonic acid catalyst or a Lewis acid catalyst, such as zinc chloride or indium trichloride. The resulting polymer has a plurality of recurring triazine rings interconnected with bridges or links, each of which is made up of 2 or more aromatic rings, preferably phenylene. The interconnected aromatic nuclei and triazine rings are in the form of a three-dimensional crosslinked network, the product having a high softening point, solvent resistance and thermal stability. Such properties are not dependent on halogen (e.g., fluorine) substituents in the polymer. Such polymers can be used as cure-in-place resins, or fabricated in the form of shaped articles, where thermal stability, chemical inertness, and solvent resistance are desirable or required, for example, in the case of metal-to-metal structural adhesives used in airframe assembly.

(The term "polynuclear aromatic" is used herein to means two or more divalent aromatic nuclei, e.g., phenylene, linked together by carbon-to-carbon bonds or bridging atoms or groups in the form of a linear chain.)

DETAILED DESCRIPTION OF THE INVENTION

The polynuclear aromatic dinitriles which are preferred in the practice of this invention can be represented by the general formula

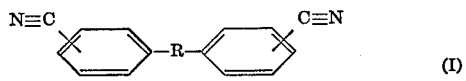

(I)

where:

R is a carbon-to-carbon bond; or R is a hydrocarbylene selected from the group consisting of a short-chain alkylene having 1 to 8 carbon atoms (e.g., methylene, ethylene, octylene, etc.), and one or a plurality (e.g., 2 to 5, preferably only 2 or 3) of phenylene nuclei; or R is a divalent hetero moiety selected from the group consisting of oxy (—O—), carbonyl (—CO—), thio (—S—), and sulfonyl (—SO₂—); or R is a phenylene, or said plurality of phenylene nuclei in the form of a chain, bonded to the terminal cyanophenyl groups shown in Formula I by said divalent hetero moieties which can also interconnect the vicinal phenylene nuclei in said chain). Where said divalent hetero moieties interconnect phenylene nuclei, only one or two types of such moieties (such as oxy and sulfonyl) are preferred, since such compounds will be easier to prepare.

Representative polynuclear aromatic dinitriles, falling within the scope of the above general Formula I are useful in the practice of this invention to form aromatic-triazine polymers, include the following (where φ represents a phenylene group, preferably a 1,4- or 1,3-disubstituted phenylene group):

NC—φ—φ—CN
NC—φ—O—φ—CN
NC—φ—S—φ—CN
NC—φ—C(O)—φ—CN
NC—φ—SO₂—φ—CN
NC—φ—CH₂—φ—CN
NC—φ—CH₂CH₂—φ—CN (all of the foregoing being old compounds whose preparation is known in the art);

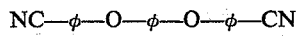

which can be prepared by brominating diphenoxy benzene and then cyanogenating the resulting dibromide with CuCN in the presence of pyridine;

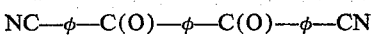

which can be prepared by reacting the diacid chloride of benzene with bromobenzene in the presence of a Friedel-Crafts catalyst and then cyanogenating the resulting dibromide with CuCN;

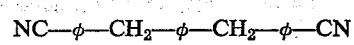

which can be prepared by reducing the previous compound;

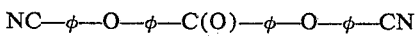

which can be prepared by reacting Cl—φ—C(O)—φ—Cl with the potassium salt of phenol and then brominating and cyanogenating as described above;

which can be prepared like the previous compound, using instead Cl—φ—SO$_2$—φ—Cl;

NC—φ—SO$_2$—φ—O—φ—SO$_2$—φ—CN which can be prepared by reacting (φ—SO$_2$Cl)$_2$O with bromobenzene and then cyanogenating with CuCN;

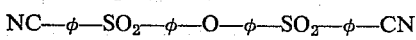

which can be prepared by reacting Br—φ—SO$_2$Cl with diphenyl sulfide or diphenyl;

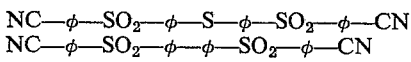

which can be prepared by reacting Br—φ—O—φ or Br—φ—CH$_2$—φ with Br—φ—SO$_2$Cl and then cyanogenating with CuCN;

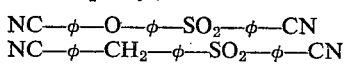

which can be prepared by oxidizing the previous compound; and the like.

When the above-described polynuclear aromatic dinitriles are thermally polymerized or condensed in the presence of trifluoromethane sulfonic acid or a Lewis acid catalyst to form high molecular weight solid polymers having recurring s-triazine rings, each such ring results from the trimerizing of nitrile groups from three molecules of the aromatic dinitrile, with the ring carbon atoms of aromatic linkages being directly attached to the ring carbon atoms of the triazine rings. This polymerization can be illustrated as follows:

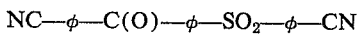

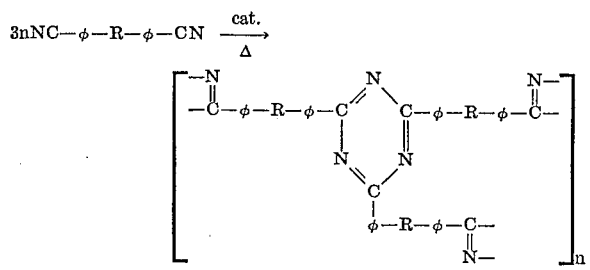

where $n$ is a large number and can be ⅓ as large as the number of molecules of the dinitrile employed.

The above illustrated polymers are high molecular weight, three-dimensional, crosslinked structures, the recurring triazine rings and aromatic linkages conferring high thermal stability, chemical inertness, and solvent resistance (for example, in common organic solvents, such as chloroform, acetone, benzene, xylene, heptane, and dimethylformamide). Most of these polymers do not soften below their decomposition temperature and have second order transitions (glass transition temperatures, Tg), as measured by differential thermal analysis (DTA), generally above 200° C., preferably 250° C. Thermogravimetric analysis (TGA) in air shows that these polymers have short term stability to over 400° C., with a 10% or less weight loss reached at 500 to 540° C. Physical properties of these polymers are retained during isothermal aging at 300° C. over extended periods of time (this is comparable of the known high temperature stable heterocyclic condensation polymers). Such polymers can be used as cure-in-place resins or fabricated in the form of shaped articles, where thermal stability, chemical inertness, and solvent resistance is desirable or required, for example, in the case of metal-to-metal structural adhesives used in airframe assembly.

The catalysts which are used to initiate and promote the trimerizing of the aromatic dinitriles are selected from the group consisting of trifluoromethane sulfonic acid, CF$_3$SO$_3$H, and Lewis acid catalysts, such as zinc chloride, indium chloride, gallium chloride, antimony chloride, aluminum chloride, boron trifluoride, ferric chloride, titanium chloride, cobalt chloride, cobalt bromide, and the like. The amount of catalyst used will vary depending upon the particular catalyst employed, and this amount, functionally expressed, is a catalytic amount or an amount sufficient to initiate and promote the polymerization or trimerization. In the case of trifluoromethane sulfonic acid, a relatively large amount is necessary and, generally, this amount will be in the range of 100 to 800 weight percent by weight of the aromatic dinitrile, the latter being soluble in the catalyst. In the case of Lewis acid catalysts, the amount will be relatively small, ranging from 0.5 to 5 weight percent, preferably 0.1 to 1 weight percent, by weight of the aromatic dinitrile, the Lewis acid catalyst being soluble at least to the extent of 0.01 weight percent in the dinitrile.

The trifluoromethane sulfonic acid catalyst rapidly promotes trimerization upon being admixed with the aromatic dinitrile; thus this admixture is prepared at relatively low temperatures to minimize premature reaction, that is, to prevent trimerization before one is ready to use or apply the resulting polymer. Such low temperatures will be in the range of −20° C. to room temperature. The Lewis acid catalysts require heat before they promote the trimerization of the aromatic dinitrile with which they are admixed. Such elevated temperatures will be in the range from 200 to 350° C. Regardless of which type of catalyst is used, it appears that they all will result in the formation of the same polymer when the same aromatic dinitrile starting material is used.

Where the catalyst used is trfluoromethane sulfonic acid, after admixture of it with the aromatic dinitrile, the admixture can be warmed or heated, for example, to temperatures in the range of 25 to 100° C., to cause the trimerization to proceed to completion. One may apply the partially trimerized product, for example, to a substrate, after warming the mixture up to room temperature, and then heat the so-applied admixture to higher temperatures to complete the trimerization. Because of the relatively large amount of trifluoromethane sulfonic acid necessary to promote the trimerization, it will generally be necessary to wash the excess catalyst from the polymerized dinitrile. Washing can be accomplished with water, preferably cold, followed by a washing with dilute alkali, and then a final wash with fresh water.

Notwithstanding the need for elevated temperatures when Lewis acid catalysts are used, these will be advantageous in that small amounts of such catalysts are adequate to promote the trimerization and it will be unnecessary in most cases to wash or otherwise treat the polymer to remove catalyst. For example, the dinitrile monomer, polymerized in this fashion, can be advantageously used in bulk as a hot metal adhesive, binder, or coating, in applications, where evolution of volatile material, including solvents, or the extraction of large amounts of catalyst, would be prohibited.

The aromatic-triazine polymers of this invention can be used to fabricate films, fibers, molded articles, etc., and can be used as adhesives, coatings, and sealants. For example, the mixture of aromatic dinitrile and Lewis acid catalyst can be applied, in otherwise conventional formulations, as a metal-to-metal structural adhesive in the fabrication of metal honeycombed airframe structures and the structure then heated to cause polymerization of the aromatic dinitrile and affect the bond. Because of the high softening point of the polymer, the metal-to-metal bond will withstand high temperatures, such as 300–400° C., often encountered by such airframe structures. For example, a solution of the aromatic dinitrile (e.g., 4,4'-dicyanodiphenyl ether) in trifluoromethanesulfonic acid can be poured on a flat substrate and heated to form a solid film, which is then washed, the film then being cut into strips and used to wrap electrical wire for purposes of high temperature insulation or reinforcement. As another example, a mixture of said dinitrile and zinc chloride can be painted on an aluminum panel, another panel laid on top thereof and the assembly heated for 6 hrs. at 200–300° C. under 25 p.s.i. to form a bond, the bonded assembly then being used in an airframe.

EXAMPLES

The object and advantages of this invention are further illustrated by the following examples, but the particular materials and amounts thereof recited in these examples, as well as other conditions and details, should not be construed to unduly limit this invention.

EXAMPLE 1

A soltuion of 2 g. of 4,4′-dicyanodiphenyl ether in 8 g. of trifluoromethane sulfonic acid is prepared at about −10° C. During warming up to room temperature, the mixture turns deep red in color and becomes viscous. It is then poured into a flat glass dish and allowed to spread into a thin layer. After heating on a hot-plate at about 70° C. for 5 minutes, the solution gels and forms a soft coating. The material is then quenched in cold water to remove the excess $CF_3SO_3H$, soaked for several hours in dilute alkali, and washed free of alkali in fresh water. A water-clear, strong and flexible film is obtained. The infrared spectrum indicates a triazine structure with characteristic absorptions present at 6.6 and 7.3μ and shows the disappearance of the nitrile absorption at 4.5μ. TGA tests of the polymer indicate a 10% weight loss at 540° C. No glass transition is detected by DTA below the decomposition point, showing that the polymer would retain high strength properties at elevated temperatures The polymer is completely insoluble in common organic solvents such as chloroform, acetone, benzene, xylene, heptane, dimethylformamide, etc., further establishing the polymer as a high molecular weight, three-dimensionally crosslinked structure.

EXAMPLE 2

Bis(p-cyanophenoxy)benzene (2 g.) is polymerized in trifluoromethane sulfonic acid (8 g.) using the same procedure and conditions as described in Example 1. A tough, water-clear film is obtained. The intermediate viscous polymer solution also can be used to pull fibers which are strong after quenching and soaking in water to remove the excess $CF_3SO_3H$. The infrared spectrum of the polymer shows it to have a triazine structure. TGA shows a 10% weight loss at 520° C. and DTA indicates a Tg at 235–255° C. The polymer is insoluble in all common organic solvents.

EXAMPLE 3

4,4′-dicyanodiphenylmethane (2 g.) is polymerized in trifluoromethane sulfonic acid (8 g.) using the same procedure and conditions as described in Example 1. A tough, water-clear film is obtained which is insoluble in all common organic solvents. The infrared spectrum shows a triazine structure for the polymer.

EXAMPLE 4

A mixture of 100 parts by weight of 4,4′-dicyanodiphenyl ether and 1 part by weight of anhydrous zinc chloride is heated in an open glass ampoule at 250°–300° C. for a period of 20 hours. The initial liquids melt cures to an extremely hard, tough resin plug of dark amber color. Characterization by infrared absorption shows the triazine peak at 6.6μ and disappearance of the cyanide (nitrile) absorption at 4,5μ. Thermogravimetric analysis- (TGA, ΔT=5°/min.) in air shows a weight loss of 10% at 560° C. During isothermal aging in air at 600° F. (315° C.) for a period of 2 weeks, the polymer loses only 2% of its weight and remains unchanged otherwise.

EXAMPLE 5

Indium trichloride is used as the catalyst for the polymerization of 4,4′-dicyanodiphenyl ether under the same conditions as described in Example 1. Essentially the same product and polymer properties are obtained.

EXAMPLE 6 p,p′-Dicyanodiphenoxy benzene is polymerized to a hard, tough polymer by heating 100 parts by weight of the monomer and 1 part by weight of indium trichloride at 250–300° C. for 20 hrs. The polymer is identified by infrared absorption as having a triazine structure. It has a weight loss of 10% after 2 weeks aging in air at 600° F. (315° C.).

EXAMPLE 7

A mixture of 2.4 g. (0.02 mole) of p-hydroxy benzonitrile, 1.4 g. of potassium carbonate, and 2.8 g. p,p′-dichlorodiphenylsulfone is fused carefully over an open flame. When most of the potassium carbonate dissolves, the temperature is raised until the reaction starts, with separation of potassium chloride, and heat is continued for about 3 min. at 250° C. The mixture is then cooled, dissolved in dimethylformamide and poured into water. The resulting precipitate is extracted with boiling methanol. The methanol solution is cooled and upon scratching the wall of the glass container with a glass rod, a white crystalline precipitate occurs. The precipitate is filtered off the mother liquor and extracted again with hot methanol but it does not dissolve therein. The precipitate, bis(p-cyanophenoxyphenyl)sulfone, is then filtered off and dried. It has a melting point of 202 to 205° C.

One-half g. of the above-prepared dinitrile is dissolved in 4.5 g. of trifluoromethane sulfonic acid at room temperature, forming a bright red solution, which gels within 30 minutes to form a soft solid. The solid is sliced into strips and soaked in water and then dried. Infrared spectral analysis of a dried slice, after soaking in water, shows the presence of triazine links, as well as the presence of amide and acid groups resulting from hydrolysis of some of the dinitrile starting material.

EXAMPLE 8

Sixty-one g. (0.1 mole) of (Br—φ—$SO_2$—φ—)$_2$O (prepared from diphenyl ether disulfonylchloride and bromobenzene), having a melting point of 192° C., is mixed with the 1:1 complex formed upon admixing 20 g. CuCN and 18 g. pyridine. The resulting mixture is placed in a 500 ml., 3-necked flask, heated under a nitrogen atmosphere to form a melt, which is stirred. The melt is then heated on an oil bath to 200° C. and kept at that temperature for 2 hrs., after which it is cooled to room temperature to form a solid cake. The cake is ground up and soaked in acid (3 parts HCl and 1 part water). The mixture is then filtered, washed with water, and then washed with methanol. The product is recrystallized from dimethylformamide and methanol, and then recrystallized from trichloromethane and charcoal, forming crystals with a melting point of 210–212° C., infrared spectral analysis verifying the product as (NC—φ—$SO_2$—φ—)$_2$O.

One-half g. of the above-prepared dinitrile is dissolved in 4.5 g. of trifluoromethane sulfonic acid at room temperature, forming a slightly red-brown solution. No change or reaction in the solution occurs after standing for 6 hrs. After 24 hrs., a soft gel forms, which after 2 days appears as a consolidated cheesey gel. This gel is soaked in water, forming a white, opaque, relatively tough plastic solid. It is dried and forms a brittle product, infrared spectral analysis of which reveals the presence of triazine rings, as well as amide and acid functionality due to some hydrolysis of the dinitrile starting material.

Various modifications and alterations of this invention will become apparent to those skilled in the art without departing from the scope and spirit of this invention, and it should be understood that this invention is not to be unduly limited to the illustrative embodiment set forth herein.

I claim:

1. A shaped article made of a polymer composition consisting essentially of a plurality of recurring units having the structure

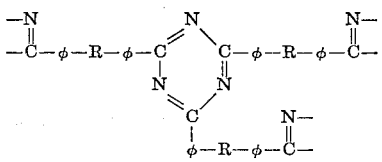

where R is a carbon-to-carbon bond, a short-chain alkylene, 1 to 5 phenylene nuclei, a divalent hetero moiety selected from the group consisting of oxy, carbonyl, thio, and sulfonyl, or 1 to 5 phenylene nuclei interconnected to vicinal phenylene nuclei through a said divalent hetero moiety, and where $\phi$ is phenylene, said polymer having a glass transition temperature above 200° C. and a TGA weight loss of 10% or less at 500 to 540° C. at 5° C./min. in air, and being insoluble in common organic solvents.

2. The article according to claim 1, wherein said R is a carbon-to-carbon bond.

3. The article according to claim 1, wherein said R is oxy.

4. The article according to claim 1, wherein said R is methylene.

5. The article according to claim 1, wherein said R is dioxyphenylene.

6. The article according to claim 1, wherein said R is oxydibenzenesulfonyl.

7. The article according to claim 1, wherein said R is sulfonyldiphenoxy.

8. A process comprising thermally polymerizing a polynuclear aromatic dinitrile in the presence of trifluoromethane sulfonic acid zinc chloride or indium chloride catalyst to produce a product comprising the composition of claim 2, said dinitrile having the structure

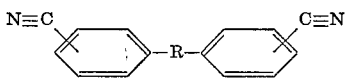

where R is a carbon-to-carbon bond, a short-chain alkylene, 1 to 5 phenylene nuclei, a divalent hetero moiety selected from the group consisting of oxy, carbonyl, thio, and sulfonyl, or 1 to 5 phenylene nuclei interconnected to vicinal phenylene nuclei through a said divalent hetero moiety.

9. The process according to claim 8, wherein said catalyst is trifluoromethane sulfonic acid.

10. The process according to claim 8, wherein R is oxy.

11. The process according to claim 8, wherein R is dioxyphenylene.

12. The process according to claim 8, wherein R is methylene, oxydibenzenesulfonyl, or sulfonyldiphenoxy.

13. The process according to claim 8, wherein said catalyst is zinc chloride.

14. A process comprising thermally polymerizing a polynuclear aromatic dinitrile in the presence of trifluoromethane sulfonic acid to produce a polymer composition, said dinitrile having the structure

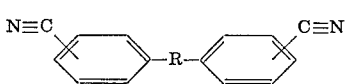

where R is a carbon-to-carbon bond, a short-chain alkylene, 1 to 5 phenylene nuclei, a divalent hetero moiety selected from the group consisting of oxy, carbonyl, thio, and sulfonyl, or 1 to 5 phenylene nuclei interconnected to vicinal phenylene nuclei through a said divalent hetero moiety, said polymer composition consisting essentially of a plurality of recurring units having the structure:

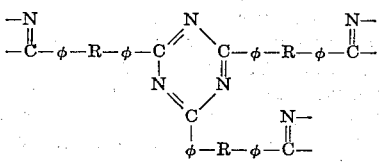

where R is as defined above and $\phi$ is phenylene, said polymer having a glass transition temperature above 200° C. and a TGA weight loss of 10% or less at 500 to 540° C. at 5° C./min. in air, and being insoluble in common organic solvents.

15. A process comprising thermally polymerizing a polynuclear aromatic dinitrile in the presence of zinc chloride to produce a polymer composition, said dinitrile having the structure:

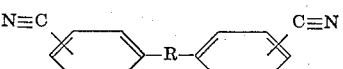

where R is a carbon-to-carbon bond, a short-chain alkylene, 1 to 5 phenylene nuclei, a divalent hetero moiety selected from the group consisting of oxy, carbonyl, thio, and sulfonyl, or 1 to 5 phenylene nuclei interconnected to vicinal phenylene nuclei through a said divalent hetero moiety, said polymer composition consisting essentially of a plurality of recurring units having the structure:

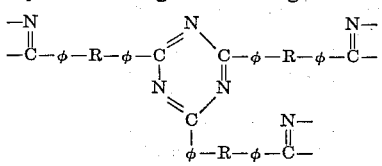

where R is as defined above and $\phi$ is phenylene, said polymer having a glass transition temperature above 200° C. and a TGA weight loss of 10% or less at 500 to 540° C. at 5° C./min. in air, and being insoluble in common organic solvents.

16. A composition comprising the mixture of a polynuclear aromatic dinitrile and a catalytic amount of zinc chloride catalyst, said dinitrile having the structure:

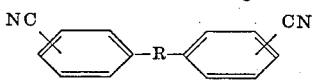

where R is a carbon-to-carbon bond, a short-chain alkylene, 1 to 5 phenylene nuclei, a divalent hetero moiety selected from the group consisting of oxy, carbonyl, thio, and sulfonyl, or 1 to 5 phenylene nuclei interconnected to vicinal phenylene nuclei through a said divalent hetero moiety.

17. A process comprising heating said composition of claim 16 to melt said dinitrile, shaping the resulting melt, and further heating the melt to form a cured-in-place shaped polytriazine article.

18. A composition comprising a solution of a polynuclear aromatic dinitrile in trifluoromethane sulfonic acid, said nitrile having the structure

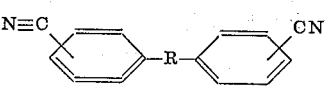

where R is a carbon-to-carbon bond, a short-chain alkylene, 1 to 5 phenylene nuclei, a divalent hetero moiety selected from the group consisting of oxy, carbonyl, thio, and sulfonyl, or 1 to 5 phenylene nuclei interconnected to vicinal phenylene nuclei through a said divalent hetero moiety.

19. A process comprising applying a layer of the composition of claim 18 to a substrate, subjecting said layer to a temperature sufficient to polymerize said dinitrile to form a film, withdrawing said trifluoromethane sulfonic acid from said film, and recovering the resulting polymeric film from said substrate.

20. The process according to claim 19, wherein said withdrawing of trifluoromethane sulfonic acid is accomplished by washing said film with water.

21. The polymeric film resulting from the process of claim 19.

References Cited

UNITED STATES PATENTS

| | | | |
|---|---|---|---|
| 2,824,088 | 2/1958 | Neher | 260—79.3 |
| 3,053,796 | 9/1962 | D'Alelio | 260—45.4 |
| 3,297,639 | 1/1967 | Picklesimer | 260—61 |
| 3,308,101 | 3/1967 | Ikeda | 260—78.4 |
| 3,317,484 | 5/1967 | Fritz et al. | 260—78.4 |
| 3,366,601 | 1/1968 | Cragar et al. | 260—47 |

OTHER REFERENCES

Johns: Am. Chem. Soc. Div. Polymer Chem. Preprints 5, 239–42 (1964), Chem. Abstr. supplied.

Tamura et al.: Kogyo Kagaku Zasshi 68, 1626–27 (1965), Chem. Abstr. supplied.

Anderson et al.: J. Polymer Sci. 4 (Pt. A1), 1689–1702 (1966), supplied by applicant.

Cook et al.: J. Chem. Soc., 1941, 278–82.

MELVIN GOLDSTEIN, Primary Examiner

U.S. Cl. X.R.

117—161 UA; 161—213; 260—47 R, 49, 63 K, 79, 79.3 M

UNITED STATES PATENT OFFICE
CERTIFICATE OF CORRECTION

Patent No. 3,654,192          Dated April 4, 1972

Inventor(s) HERWARD A. VOGEL

It is certified that error appears in the above-identified patent and that said Letters Patent are hereby corrected as shown below:

Column 2, Line 14, "means" should read --mean--

Column 8, Lines 60-63, the formula of the structure should read:

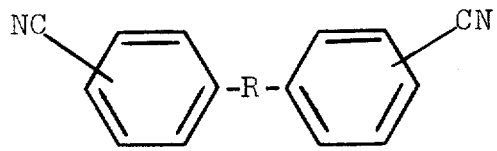

Signed and sealed this 12th day of September 1972.

(SEAL)
Attest:

EDWARD M. FLETCHER, JR.          ROBERT GOTTSCHALK
Attesting Officer                 Commissioner of Patents